(12) United States Patent
Harvey et al.

(10) Patent No.: US 8,439,122 B2
(45) Date of Patent: May 14, 2013

(54) RADIAL SPRING LATCH APPARATUS AND METHODS FOR MAKING AND USING SAME

(75) Inventors: Peter R. Harvey, Tampa, FL (US); Michael H. Johnson, Katy, TX (US); Yang Xu, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 289 days.

(21) Appl. No.: 12/882,595

(22) Filed: Sep. 15, 2010

(65) Prior Publication Data

US 2011/0000681 A1 Jan. 6, 2011

Related U.S. Application Data

(62) Division of application No. 11/638,761, filed on Dec. 14, 2006, now Pat. No. 7,798,213.

(51) Int. Cl.
*E21B 17/02* (2006.01)
*E21B 17/03* (2006.01)
*E21B 17/046* (2006.01)
*E21B 17/07* (2006.01)

(52) U.S. Cl.
USPC ............. 166/381; 166/242.1; 166/242.6; 166/242.7

(58) Field of Classification Search .......... 166/242.1, 166/242.6, 242.7, 381, 380; 403/372, 371; 285/330, 390
See application file for complete search history.

(56) References Cited

U.S. PATENT DOCUMENTS

| | | | |
|---|---|---|---|
| 2,341,233 A | 2/1944 | Norton | |
| 2,382,291 A | 8/1945 | Carlberg | |
| 2,443,249 A | 6/1948 | Jackson | |
| 2,775,304 A | 12/1956 | Zandmer | |
| 2,855,049 A | 10/1958 | Zandmer | |
| 2,896,351 A | 7/1959 | Wagner | |
| 2,947,557 A | 8/1960 | Schwab et al. | |
| 3,245,472 A | 4/1966 | Zandmer | |
| 3,306,639 A | 2/1967 | Lyon | |
| 3,326,291 A | 6/1967 | Zandmer | |
| 3,347,317 A | 10/1967 | Zandmer | |
| 4,285,398 A | 8/1981 | Zandmer et al. | |
| 4,304,428 A * | 12/1981 | Grigorian et al. | ............. 285/333 |
| 4,329,800 A | 5/1982 | Shuman | |
| 4,364,587 A * | 12/1982 | Samford | ............................ 285/3 |

(Continued)

FOREIGN PATENT DOCUMENTS

| | | |
|---|---|---|
| EP | 0224942 A1 | 9/1986 |
| EP | 0480584 A2 | 4/1992 |
| EP | 0418434 B1 | 11/1993 |
| GB | 2306531 A | 5/1997 |
| WO | 90/15282 | 12/1990 |

OTHER PUBLICATIONS

Garfiled, Garry, et al., "Novel completion Technology Eliminates Formation Damage and Reduces Rig Time in Sand Control Applications", SPE/IADC 92596, Feb. 2005, 1-6.

(Continued)

*Primary Examiner* — Cathleen Hutchins
(74) *Attorney, Agent, or Firm* — Steve Rosenblatt

(57) ABSTRACT

New locking connector assemblies and telescoping extension/retraction assemblies are disclosed that operate on the natural spring rate constraints of radial protrusions or radially constrained rings as they interact with engaging members to provide the locking force and permit the connector and extension retraction assemblies to be engage and disengaged or extended and retracted.

20 Claims, 11 Drawing Sheets

U.S. PATENT DOCUMENTS

| | | | |
|---|---|---|---|
| 4,561,683 | A | 12/1985 | Lumsden et al. |
| 4,596,405 | A | 6/1986 | Jones |
| 4,618,000 | A | 10/1986 | Burris, II |
| 4,658,902 | A | 4/1987 | Wesson et al. |
| 4,720,124 | A * | 1/1988 | Taylor et al. .................... 285/18 |
| 5,224,556 | A | 7/1993 | Wilson et al. |
| 5,265,675 | A * | 11/1993 | Hearn et al. .................. 166/297 |
| 5,681,059 | A | 10/1997 | Mackie |
| 5,829,520 | A | 11/1998 | Johnson |
| 6,532,846 | B2 | 3/2003 | Lin |
| 7,422,069 | B2 | 9/2008 | Richard et al. |

OTHER PUBLICATIONS

Garfiled, G., "One-Trip Sand Control-Completion Technology That Eliminates Perforation Damage While Reducing Rig Time", SPE 93926, 2005,1-5.

Garfield, G.L., et al., "Technology Development and Field Testing on North Slope Leads to Improved Reliability of the One-Trip Sand-Control Completion System", May 2006, SPE 100424, May 2006,1-10.

Garfield, G., et al., "Novel Completion Technology Eliminates Formation Damage and Reduces Rig Time in Sand Control Applications", SPE 93518, Mar. 2005, 1-5.

McElfresh, P., et al., "Maximizing Inflow Performance in Soft Sand Completions Using New One-Trip Sand Control Liner Completion Technology", SPE 94322, May 2005, 1-5.

Garfield, G., "New One-Trip Sand-Control Completion System That Eliminates Formation Damage Resulting from Conventional Perforating and Gravel-Packing Operations", SPE 96660, Oct. 2005, 1-5.

* cited by examiner

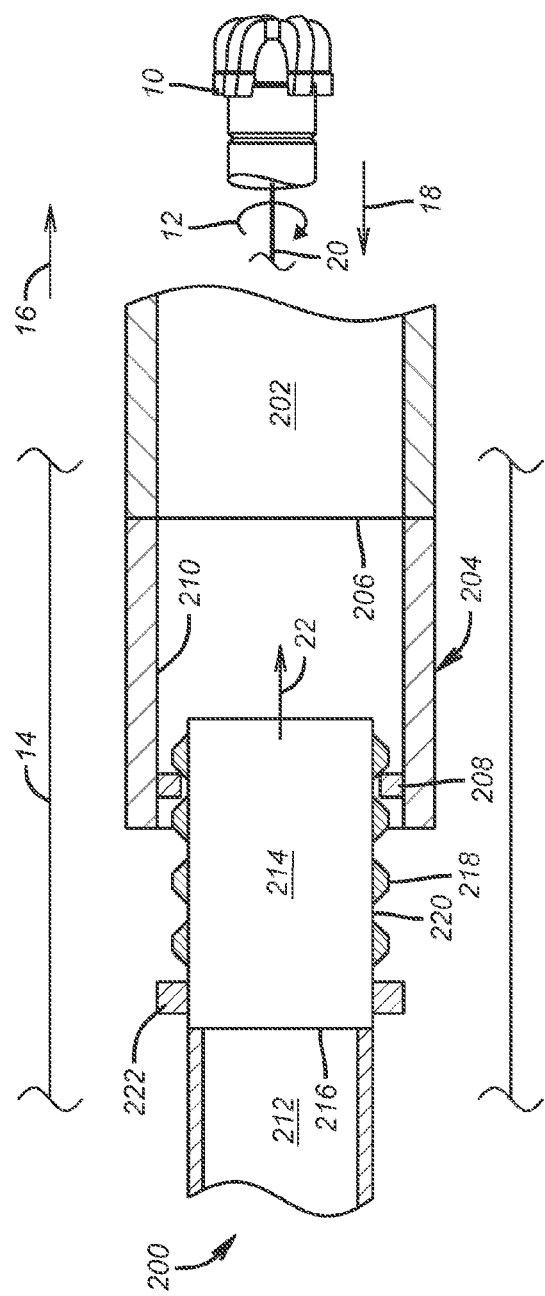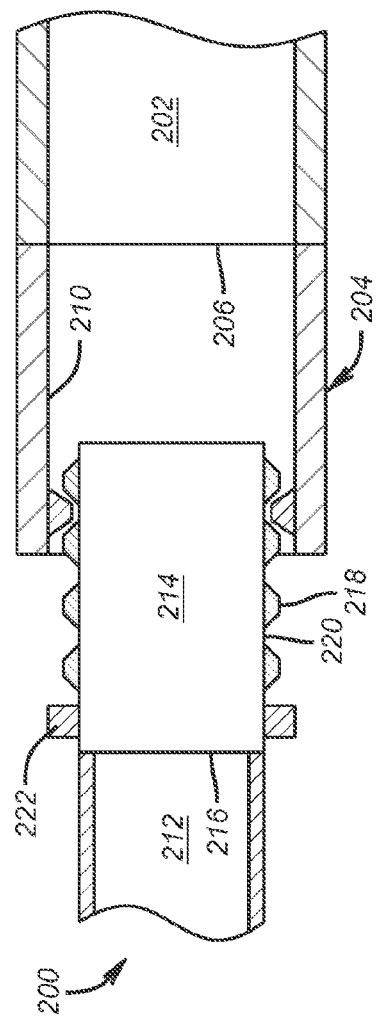
FIG. 2A
FIG. 2B

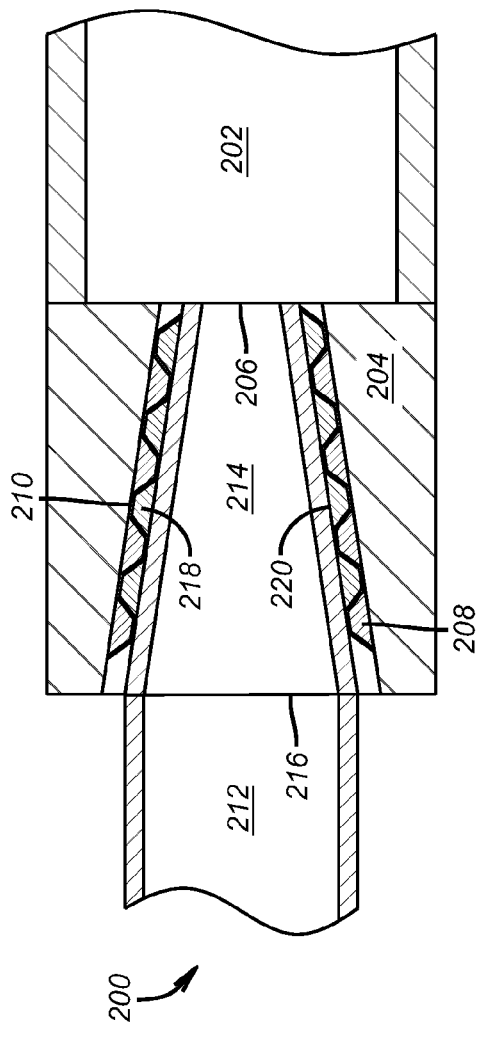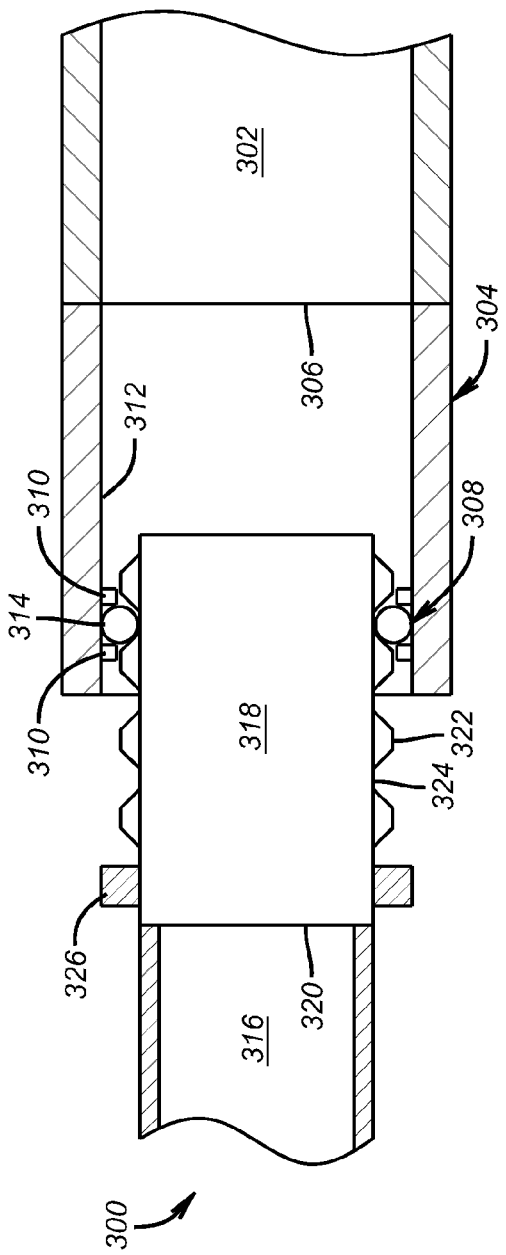

RADIAL SPRING LATCH APPARATUS AND METHODS FOR MAKING AND USING SAME

PRIORITY INFORMATION

Field of the Invention

This application is a divisional of U.S. patent application Ser. No. 11/638,761 filed on Dec. 14, 2006.

BACKGROUND OF THE INVENTION

1. Field of the Invention

The present invention relates to a locking apparatus and a method for using the locking apparatus, where the locking apparatus is ideally suited for oil field applications such as drilling, completions, and/or production applications.

More particularly, the present invention relates to a latching or locking apparatus including a first member and a second member, where the first member includes an inner surface having an inwardly extending protrusion and the second member includes an outer surface having a plurality of a grooves and a bumps and where the second member is designed to slide into the first member so that the protrusion of the first member lockingly engages the bumps and grooves of the second member. The present invention also relates to methods for making and using same.

2. Description of the Related Art

The mechanisms currently deployed during drilling, completions, and/or production operations in a well borehole make use of a slotted sleeve as a spring element. The slots of the sleeves may have closed ends or opened ends. These slotted tubular elements are sometimes referred to as spring collets. Devices using these spring collets are commonly used for positioning sleeves in a predefined manner as an integral part of a tool assembly within a well bore. Additionally, devices using these spring collets are used for electrical connectors where they maintain conductivity between mating contacts.

These slotted sleeve elements do not lend themselves to shifting sleeve elements that must seal out fluids and/or avoid debris accumulation. Additionally, the specific forces required to operate mechanisms including spring collets are often high and require a separate shear element mechanism for initiation.

Thus, there is a need in the art for an improved spring element that can be operated during drilling and completion operations and is capable of producing a seal to reduce or prevent the intermixing of materials.

SUMMARY OF THE INVENTION

The present invention provides a locking apparatus which utilizes a natural spring constant of a protrusion or a hoop or ring engaging a grooved surface to create a latching force of a desired magnitude. The locking apparatus of this invention is capable of achieving a higher locking force, is capable of being stiffer than slotted spring apparatuses, and is capable of forming a fluid tight seal for preventing fluid loss or fluid intermixing.

The present invention provides a spring loaded extension and retraction apparatus including an inner sleeve having a distal radial stop disposed on its outer surface at its distal end. The inner sleeve also includes a proximal radial stop, an O-ring radial groove and an O-ring situated in the groove, all three elements disposed on its outer surface at its proximal end. The inner sleeve also includes a first plurality of spaced apart, radial detents disposed along its outer surface extending from its proximal stop to its distal stop. The extension/retraction apparatus also includes an outer sleeve having an inner radial stop disposed at its distal end, an outer distal radial stop disposed at its distal end, an outer proximal radial stop disposed at or near its distal end, and a second plurality of outer detents associated with its outer surface between the proximal stop and the distal stop. The inner sleeve is designed to slidably engage the outer sleeve so that the first plurality of detents engages the inner distal stop of the outer sleeve. The extension/retraction apparatus also includes an outer sleeve engaging member including a distal stop and a seal mounted in a housing, where the outer sleeve engaging member distal stop is adapted to engage the second plurality of radial detents. Thus, the extension/retraction apparatus can be extended in two different motions. First, then inner sleeve can be extended in a step-wise fashion due to the interaction between the inner distal radial stop of the outer sleeve and the first plurality of detents on the outer surface of the inner sleeve. Second, the outer sleeve can be extended in a step-wise fashion due to the interaction between the outer sleeve engaging member distal radial stop of the outer sleeve engaging member and the second plurality of detents on the outer surface of the outer sleeve. The inner sleeve is inserted into the outer sleeve by overcoming an engaging force between the distal stop of the inner sleeve and the inner distal stop of the outer sleeve. This force is greater than a force need to extend the inner sleeve step-wise by pushing the inner distal radial stop of the outer sleeve past each of the detents on the outer surface of the inner sleeve. In this way, the inner sleeve can be ratcheted in and out of the outer sleeve via the application of an internal force either to the proximal end of the inner sleeve (out) or the distal end of the inner sleeve (in). The sleeve detents or bumps require radial expansion or contraction to activate as does the detent engaging member disposed on the inner surface at or near the distal end of the outer sleeve, where a force required to expand or contract the detents and detent engaging member depend on spring rates of radial detents and the radial detent engaging member, their surface finishes, surface hardness, material elastic properties and other properties as well as their geometrical or structural properties such as an amount of radial deflection, a ramp angle, and an axial length of detent, and the structural properties and other relevant properties.

The present invention provides a spring loaded extension and retraction apparatus having flexibility for a desired load and for activating the mechanism, where the apparatus includes a ring detent engaging member fitted into a mating groove, which constrained its radial motion. The ring detent engaging member is preferably hollow and cylindrical, but any hollow or solid ring geometry can be used depending on desired latching characteristics needed for a given application. Moreover, the ring may be constructed of material different from the material used to construct the other components of the apparatus. This configuration of the extension/retraction apparatus includes an independent spring element and a sleeve hoop spring element instead to two sleeve hoop spring elements, where the independent spring element is constrained radially. Thus, the radial cross-section of the independent spring element undergoes a major amount of the deformation during extension or retraction (motion in the axial direction) past a detent on the outer surface of the inner sleeve, while in the other configuration, the sleeve hoop spring element, the detents and the detent engaging members, both undergo deformation to allow extension or retraction of the inner sleeve.

The present invention provides a method for downhole operation including the steps of connecting a tool or drill bit assembly to a drill string, where the distal end of the drill string includes a male or female connector and a proximal end of the tool or the drill bit assembly includes a female or male connector, where the male connector includes a detent engaging member disposed on an inner surface of the male connector and the female connector includes a plurality of detents disposed on an outer surface of the female connector extending from the proximal end of the female connector toward a distal end of the tool or the drill bit assembly, where the female connector is designed to be inserted into the male connector with sufficient force to push the engaging member over each of the plurality of detents.

The present invention provides a method for extending a telescoping assembly including the step of applying an external force sufficient to extend a telescoping assembly a desired amount, where the telescoping assembly includes a mount disposed in an aperture of a housing. An outer sleeve is supported on the mount in the aperture and an inner sleeve is mounted within the outer sleeve, where the outer sleeve includes a detent engaging member disposed on an inner surface of the outer sleeve near a proximal end of the outer sleeve and the inner sleeve includes a plurality of detents disposed on an outer surface of the inner sleeve.

BRIEF DESCRIPTION OF THE DRAWINGS

The invention can be better understood with reference to the following detailed description together with the appended illustrative drawings in which like elements are numbered the same:

FIGS. 2A-C depict three different preferred embodiment of a connector assembly of this invention;

FIG. 3 depicts another preferred embodiment of a connector assembly of this invention including a separate detent engaging ring;

DETAILED DESCRIPTION OF THE INVENTION

Figure 1B:
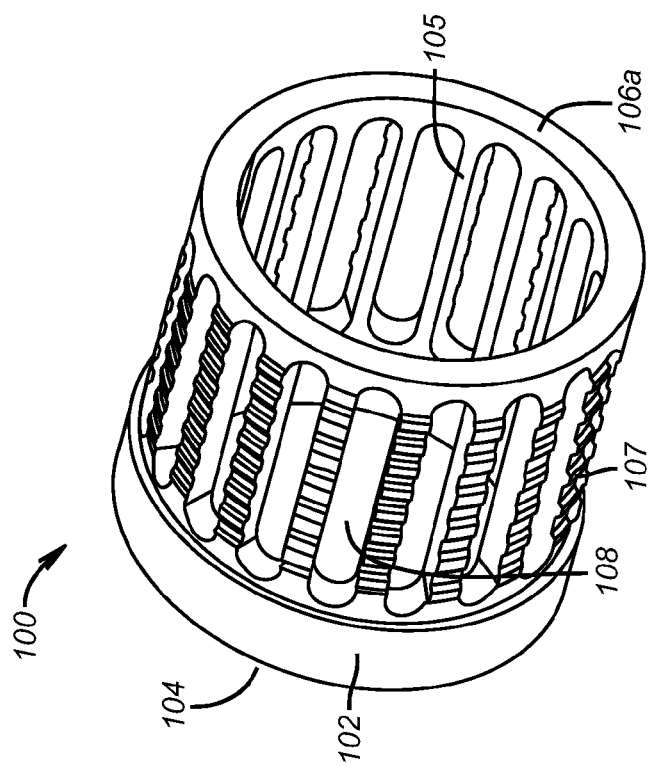
FIGS. 1A & B depict two prior art radial locking devices.

The inventors have found that a new extension/retraction apparatus can be constructed where the locking force is achieved via the interaction of sleeve deployed detents and detent engaging elements disposed on opposed surfaces of an inner sleeve and an outer sleeve or on opposed surfaces of an outer sleeve and an outer sleeve mount. The apparatus extends or retracts in a ratchet-like motion in an axial or in and out direction due to application of an external force acting on the proximal or distal end of the inner sleeve sufficient to step-wise extend or retract the inner sleeve relative to the outer sleeve. The ratchet-like motion results from the interaction of detents or bumps on the outer surface of a sleeve and a detent engaging element on the inner surface of a second sleeve or a sleeve mounting assembly. The interaction between the detents and the detent engaging element cause the detents and/or the detent engaging element to undergo radial expansion or contraction as the element move past the detent in response to the application of an external force sufficient to move the element past the detent. The load required to expand or contract either the detents or both the detents and the detent engaging element will depend on a hoop spring rate of the detents and the element, a geometry of the element and the detents such as an amount of radial deflection, a ramp angle, and an axial length, surface properties of the element and the detents such as finish, hardness, etc. and on material properties of the element and detents such as elasticity, deformability, etc.

The present invention broadly relates of a new extension/retraction apparatus including a first member having a male connector and a second member having a female connector. The male connector is disposed at a proximal end portion of the first member and includes a detent engaging element disposed radially on an inner surface of the male connector near the proximal end of the first member. The female connector is disposed at a distal end portion of the second member and includes a plurality of detents disposed on an inner surface thereof. The female connector is designed to be inserted into the male via the application of a force on the first member, the second member or both members to push the element on the male connector inner surface past successive detents on the female connector outer surface. If each detent is identical or substantially similar (within 5% of being identical), then the actuating force with be the same or similar, but if each detent has different properties, then the applied force will be different. Thus, as one step-wise pushes the element past each detent, the force needed can start off high and get easier, stay constant or start off low and increase. Moreover, the male and female connectors can be straight or tapered allowing greater design flexibility and allowing greater flexibility in locking strengths. The present invention also broadly relates to connecting or disconnecting a connection between the first and second members via the application of an external force or a series of external force steps.

The present invention broadly relates of a telescoping apparatus including an inner sleeve and an outer sleeve mounted in an aperture of a housing. The inner sleeve includes a plurality of detents disposed on its outer surface, while the outer sleeve includes a detent engaging element disposed on its inner surface. The inner sleeve is designed to fit within the outer sleeve and the detents and element are designed to permit the inner sleeve to telescope in and out (extend or retract) relative to the outer sleeve and the housing. The apparatus may also include a second plurality of detents disposed on an outer surface of the outer sleeve and an outer sleeve mounting assembly disposed in the aperture of the housing, where the assembly includes a second detent engaging element. The second element and second plurality of detents permits the outer sleeve to telescope in and out relative to the housing, while the inner sleeve can telescope in and out relative to the outer sleeve. Moreover, the apparatus can include other sleeves and associated element and detents to form a telescoping apparatus having three or more telescoping stages.

The present extension/retraction apparatus makes use of a natural spring rate of a hoop direction of a tube to create a latching mechanism that is much stiffer than a slotted geometry of a compression ring assembly and, unlike the compression rings of the prior art, the apparatus of this invention is capable of forming a fluid tight seal providing connections that be made that allow circulation of different fluids without fluid exchange. The present invention is ideally suited for constructing telescoping apparatus for use in oil and gas drilling and production, such as telescoping apparatus deployed from a casing string. In this configuration, the apparatus includes an inner sleeve, an outer sleeve and an outer sleeve mounting assembly deployed in an aperture in the casing string. The fully retracted position is shown first, followed by the fully extended position. As internal pressure (pressure directed from left to right) is applied, the sleeves with detents are driven outward.

Suitable material out of which the components of this invention can be made include, without limitation, metals, high performance plastics, hard rubber compounds, composites, or mixtures or combinations thereof. Exemplary metals include, without limitation, iron alloys, cobalt alloys, nickel alloys, copper alloys, or mixture or combinations thereof. Exemplary high performance plastics including, without limitation, polyolefins, epoxies, urethanes, thermal plastics, thermal plastic elastomers, polyamides, polyimides, acrylates, polyvinyl chloride, or mixture or combinations thereof. Exemplary composites include, without limitation, fiber reinforced polymers, carbon black reinforced polymers, silica reinforced polymers, fiber reinforced ceramics or polymer/ceramic blends or mixture or combinations thereof. Exemplary polymers include, without limitation, thermal setting polymer, curing polymer systems, or mixtures or combinations thereof. Thermal setting polymer includes, without limitation, phenol/formaldehyde resins, etc. Curing polymer systems include, without limitation, epoxy resins, urethane resins, silicon resins, aramide resins, elastomers, or mixture or combinations thereof.

The present invention also provides a telescoping apparatus including an outer sleeve having a reduced inner diameter (ID) to allow an interference fit with an outer diameter (OD) of an inner sleeve. A length of the reduced ID portion of the outer sleeve can vary. The ID of outer sleeve can vary several times to form multiple steps as shown in FIG. 2A.

Figure 7E:
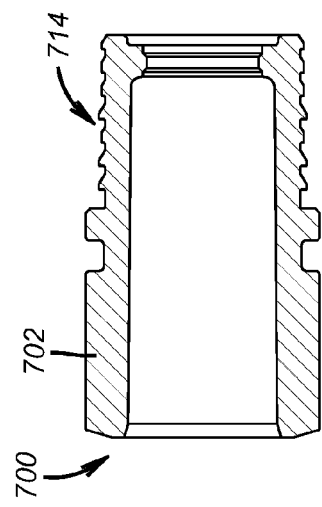
FIGS. 7A-F depict six preferred embodiment of sleeves and detents for use in the connections and extension/retraction assemblies of this invention.
Figure 7C:
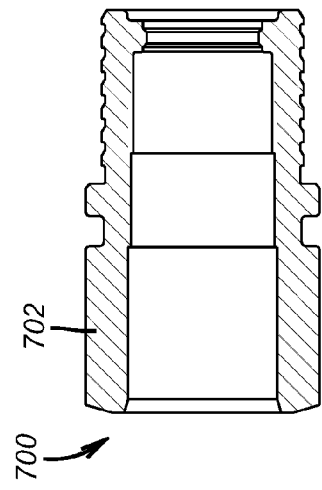
Figure 7A:
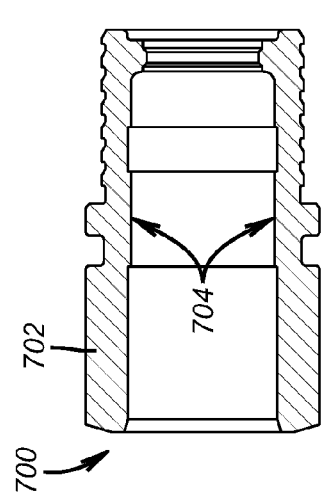
Figure 7F:
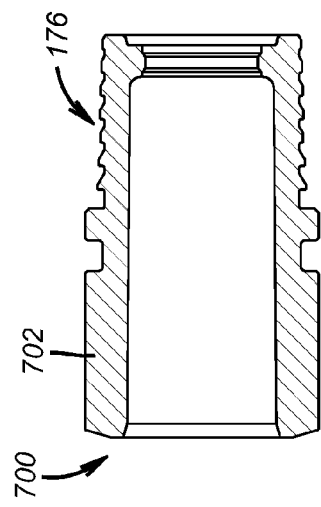
Figure 7D:
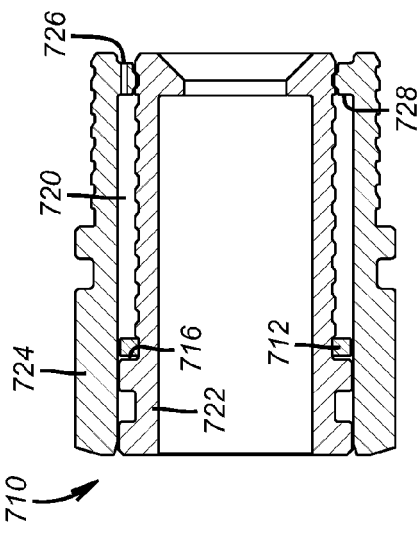
Figure 7B:
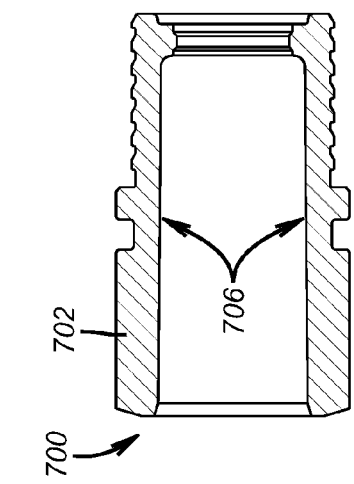

A telescoping apparatus as described in FIG. 7B may have a tapered ID.

A telescoping apparatus can have varying OD of the detents on the outer surface of the inner sleeve. This includes each detent has different ODs as shown in FIG. 1D and the OD of all detents is tapered, as shown in FIG. 2C.

A telescoping apparatus can have a cushion device installed on either outer surface of inner sleeve or inner ID of outer sleeve. The cushion device is between two shoulders of the inner sleeve and outer sleeve. The cushion device includes rubber ring, metal crush ring, spring, plastic ring or etc.

Figure 1A:
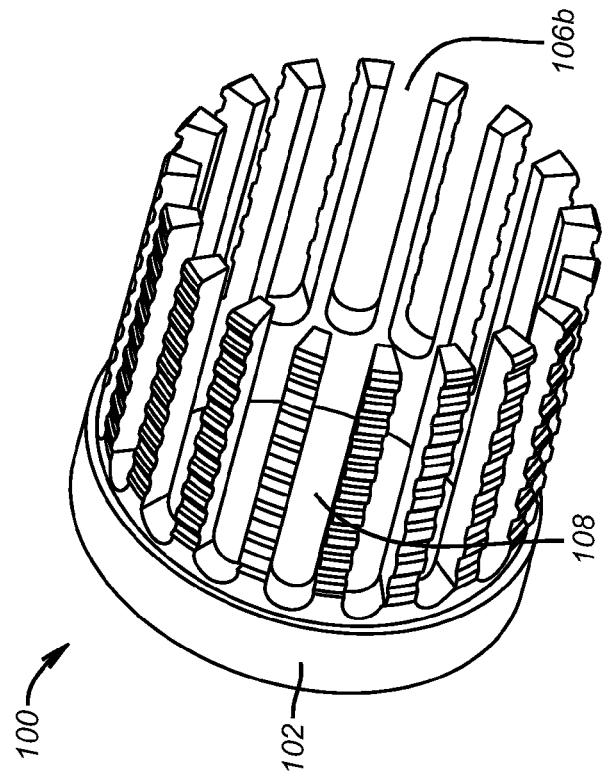

Referring now to FIGS. 1A and 1B, two prior art radial springs, generally 100, are shown to include a tube 102 having a closed first end 104 and closed second end 106a as shown in FIG. 1A or an opened second end 106b as shown in FIG. 1B and a plurality of closed or opened axially extending slots 108, where the spring 100 is contracted radially to produce a locking force and spring back when the no longer radially constrained. While these devices provided for a resistance to telescoping and permitted telescoping action as the teeth 107 flexed radially as the tube 102 went past a detent, they presented operational problems in use. The use of thin members 105 on which teeth 107 were disposed created problems as the members 105 would twist and snap or simply fatigue from being radially displaced and fail. Another limitation in using the designs of FIGS. 1A and 1B is that the open structure using slots 108 did not allow for sealing between the tube 102 and another tube (not shown) that surrounds it on which the detent that interacted with the teeth 107 was located.

Referring now to FIGS. 2A-B, a preferred embodiment of a radial spring connector assembly of this invention, generally 200, is shown to include a first member 202 having a female connector 204 disposed on a distal end 206 thereof. The female connector 204 includes a detent engaging element 208 extending inwardly from an inner surface 210 of the female connector 204. The radial spring connector assembly 200 also includes a second member 212 having a male connector 214 disposed on its proximal end 216. The male connector 214 includes a plurality of detents 218 disposed on an outer surface 220 of the male connector 214. The male connector 214 is adapted to be inserted into the female connector 204 with sufficient force to push the element 208 past one or more of the plurality of the detents 218. The locking force of the connection is dictated by geometry of the element 208 and the detents 218, their surface and material properties. Once engaged, the connection can be disengaged by applying a force sufficient to the first or second member with the other fixed or applied oppositely to both to overcome the spring rate of the element-detent interaction. By changing the material and geometry of the element 208 and the detents 218, the locking force at each detent can be varied. Thus, each detent can have a different spring rate based on its geometry, its surface and material properties. The male connector 214 can also and optionally include a radial stop 222 adapted to engage the engaging element 208 and stop the extent to which the male connector 214 can be inserted into the female connector 204. In FIG. 2A, the engaging member 208 is square shaped, while in FIG. 2B, the engaging member 208 is trapezoidially shaped. One skilled in the art will recognize that the engaging member shape will affect the locking force and the shapes of the engaging member and the detents control to some extent the locking force of the connectors.

Also shown in FIG. 2A is a schematically illustrated drill bit 10 which rotates as in arrow 12 and is lowered into a borehole 14 as represented by arrow 16. Arrow 18 represents the ultimate removal of the bit 10. Tubular string 20 connects the bit 10 to the first member 202 in the borehole 14. Member 214 can be pushed into 210 at the surface or in the borehole 14 as shown in FIG. 2A by arrow 22.

Referring now to FIG. 2C, another preferred embodiment of a radial spring connector assembly of this invention, generally 200, is shown to include a first member 202 having a tapered female connector 204 disposed on a distal end 206 thereof. The female connector 204 includes a first plurality of detents 208 extending downwardly from an inner surface 210 of the female connector 204. The radial spring connector assembly 200 also includes a second member 212 having a tapered male connector 214 disposed on its proximal end 216. The male connector 214 includes a second plurality of detents 218 disposed on an outer surface 220 of the male connector 214. The male connector 214 is adapted to be inserted into the female connector 204 with sufficient force to push the each successive first detents 208 past each successive second the detents 218. The locking force of the connection is dictated by geometry of the detents 208 and the detents 218, their surface and material properties. Once engaged, the connection can be disengaged by applying a force sufficient to the first or second member with the other fixed or applied oppositely to both to overcome the spring rate of the element-detent interaction. By changing the material and geometry of the first detents 208 and the second detents 218, the locking force at each detent can be varied. Thus, each detent can have a different spring rate based on its geometry, its surface and material properties.

Referring now to FIG. 3, another preferred embodiment of a radial spring connector assembly of this invention, generally 300, is shown to include a first member 302 having a female connector 304 disposed on a distal end 306 thereof. The female connector 304 includes a detent engaging assembly 308 including two restraints 310 extending inwardly from an inner surface 312 of the female connector 304 and a detent engaging ring 314 disposed between the two restraints 310 so that the restraints 310 radially constraint the ring 314. The ring 314 also extends inwardly from the inner surface 312 of the female connector 304. The radial spring connector assembly 300 also includes a second member 316 having a male connector 318 disposed on its proximal end 320. The male connector 316 includes a plurality of detents 322 disposed on an outer surface 324 of the male connector 316. The male connector 316 is adapted to be inserted into the female connector 304 with sufficient force to push the ring 314 past one or more of the plurality of the detents 322. The locking force of the connection is dictated by geometry of the ring 314 and the detents 322, their surface and material properties. Once engaged, the connection can be disengaged by applying a force sufficient to the first or second member with the other fixed or applied oppositely to both to overcome the spring rate of the element-detent interaction. By changing the material and geometry of the ring 314 and the detents 322, the locking force at each detent can be varied. Thus, each detent can have a different spring rate based on its geometry, its surface and material properties. The male connector 316 can also and optionally include a stop 326 adapted to engage the ring 314 and stop the extent to which the male connector 316 can be inserted into the female connector 304.

Figure 4A:
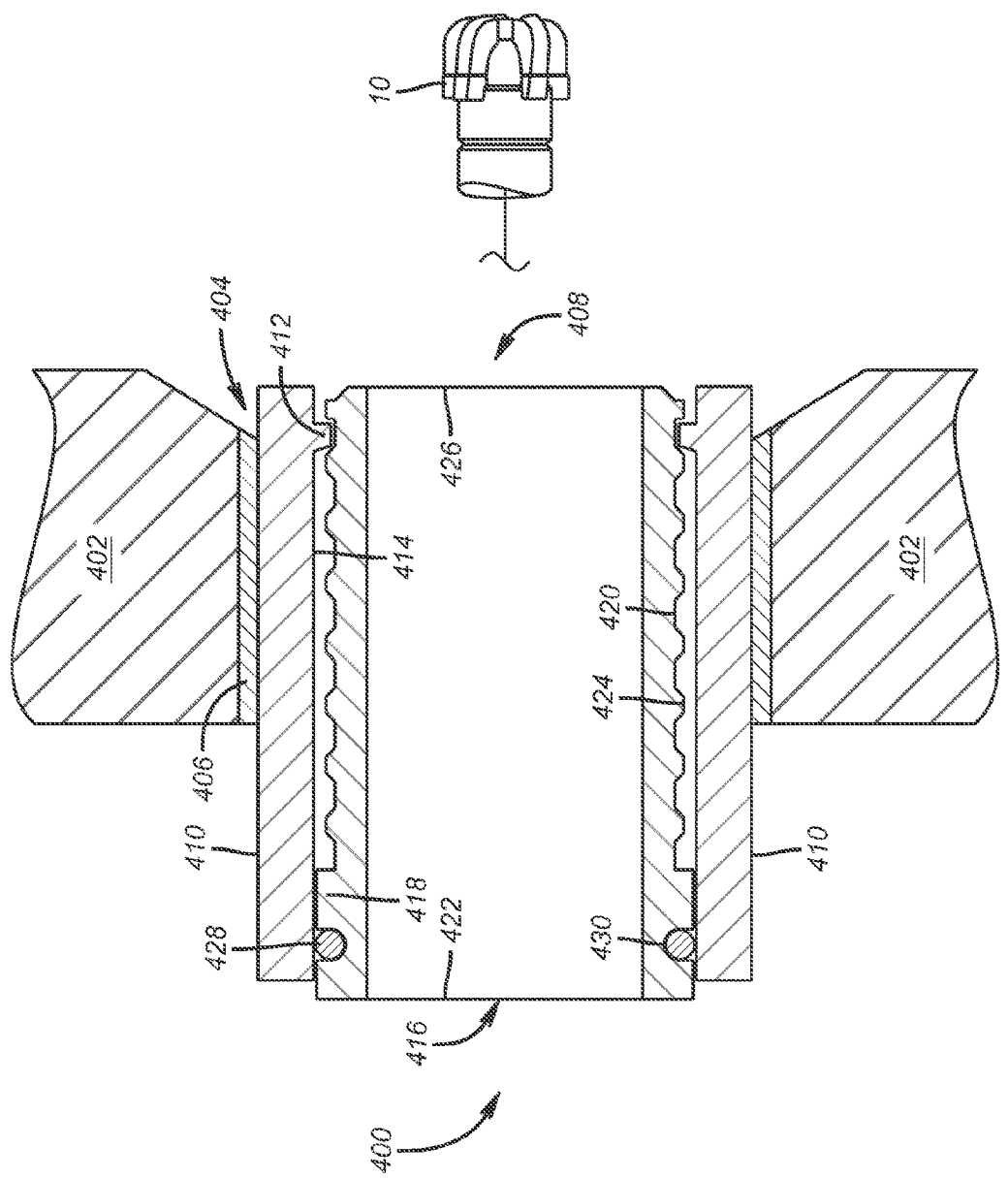
FIGS. 4A & B depict a preferred embodiment of an extension/retraction assembly of this invention having a single extendable sleeve in a non-extended and partially extended configuration, respectively.
Figure 4B:
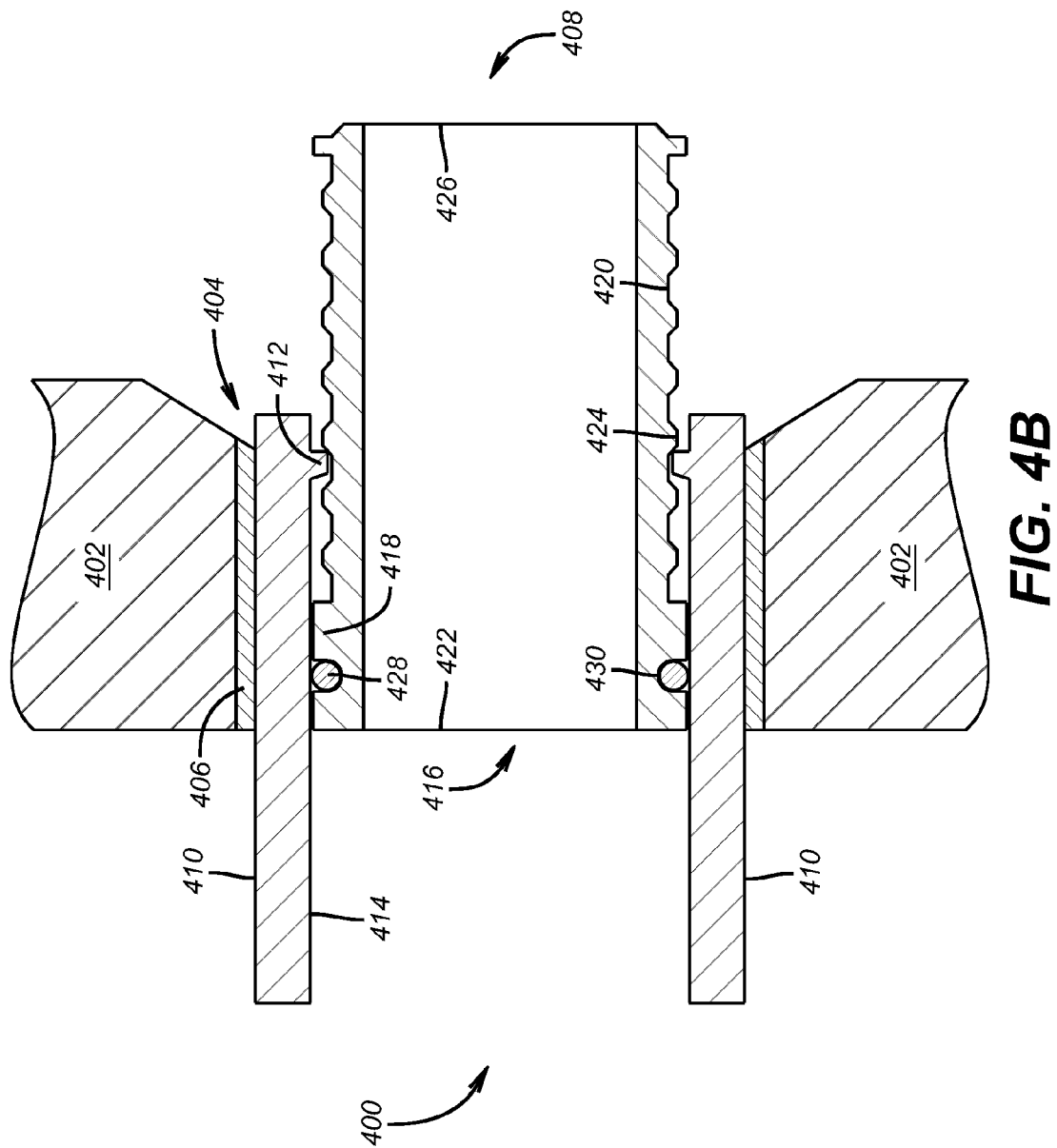

Referring now to FIGS. 4A-B, a preferred embodiment of an extension/retraction apparatus of this invention, generally 400, is shown in its contracted state and in a partially extended state, respectively. The apparatus 400 includes a housing 402 including an aperture 404 having mounted therein a mount 406 supporting an extension/retraction spring locking assembly 408. The assembly 408 includes an outer sleeve 410 disposed on the mount 406. The outer sleeve 410 also includes a detent engaging element 412 extending downwardly from an inner surface 414 of the outer sleeve 410. The assembly 408 also includes an inner sleeve 416 mounted within the outer sleeve 410, where the inner sleeve 416 includes a stop 418 disposed on an outer surface 420 of the inner sleeve 416 near a proximal end 422 of the inner sleeve 416 and a plurality of spaced apart radial detents 424 disposed on the outer surface 420 of the inner sleeve 416 extending from at or near a distal end 426 to the stop 418 of the inner sleeve 416. The inner sleeve 416 is designed to stepwise extend out from the outer sleeve 410 as sufficient force is applied to the proximal end 422 of the inner sleeve 416 to push the engaging element 412 past one or more of the spaced apart detents 424. The inner sleeve 416 can be retracted by applying a sufficient force to the distal end 426 to push the engaging member 412 back past one or more of the spaced apart radial detents 424. The apparatus 400 can also includes o-rings 428 situated within an o-ring groove 430. Although o-rings in grooves are recited as the preferred embodiment, such a reference to o-rings is intended to encompass all equivalent seal assemblies. Bit 10 is shown to be connected to the tubular wall 402 below the assembly 408.

Figure 5A:
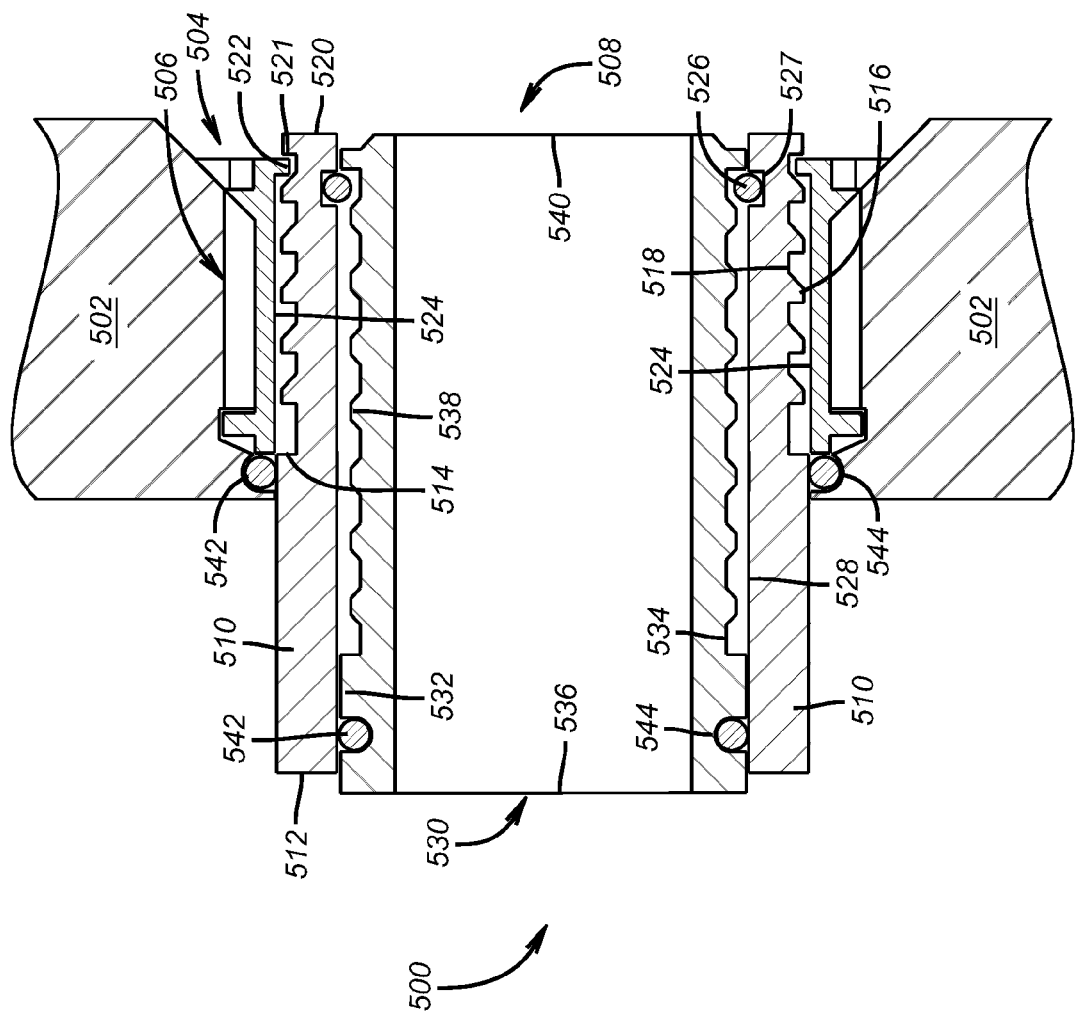
FIGS. 5A & B depict another preferred embodiment of a extension/retraction assembly of this invention having two extendable sleeves and one detent engaging ring in a non-extended and partially extended configuration, respectively.
Figure 5B:
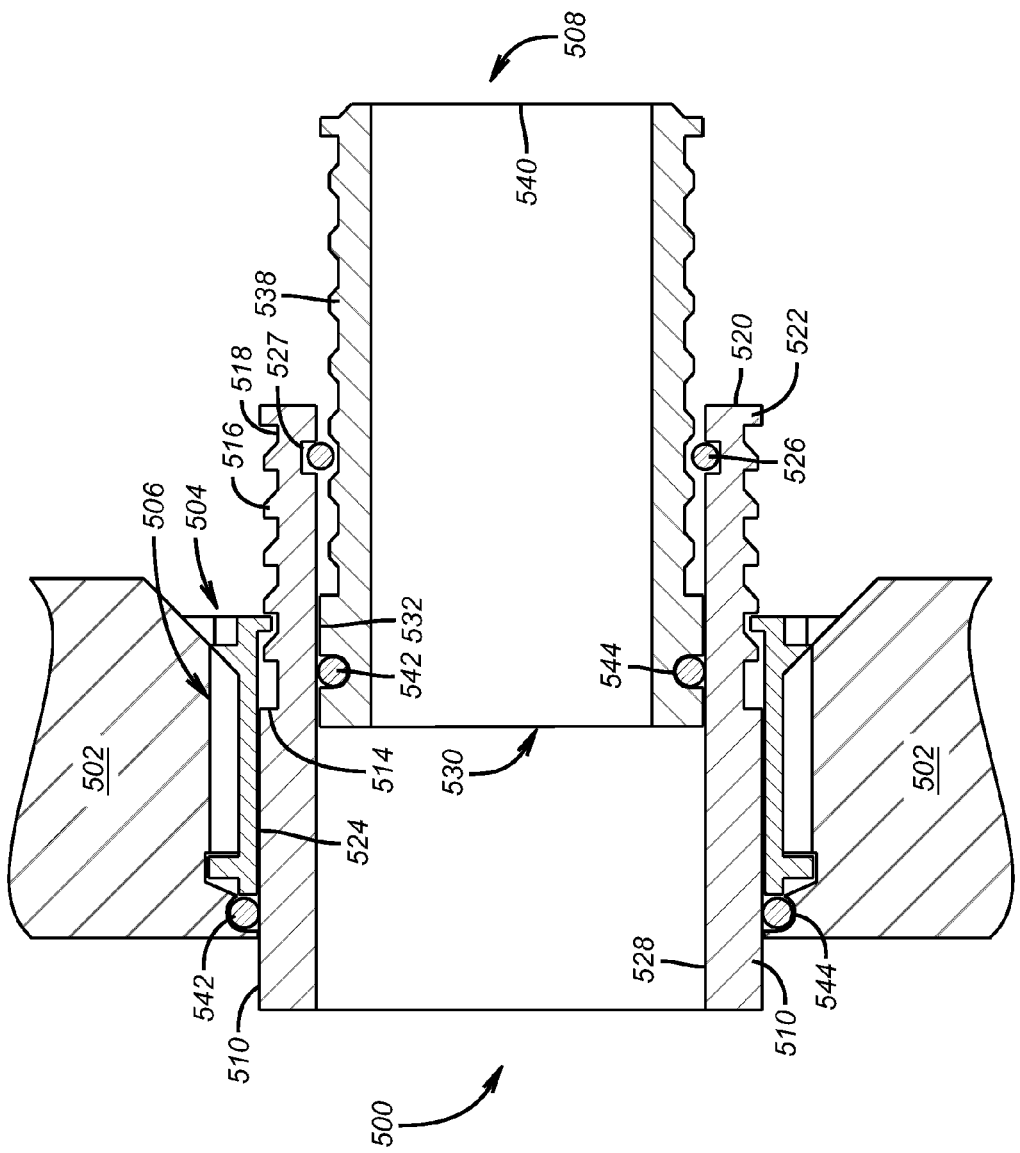

Referring now to FIGS. 5A-B, another preferred embodiment of an extension/retraction apparatus of this invention, generally 500, is shown in its contracted state and in a partially extended state. The apparatus 500 includes a housing 502 including an aperture 504 having mounted therein an outer sleeve support 506 supporting an extension/retraction spring locking assembly 508. The assembly 508 includes an outer sleeve 510 mounted on the support 506. The outer sleeve 510 includes a proximal end 512, a first stop 514 and a first plurality of spaced apart radial detents 516 disposed on an outer surface 518 of the outer sleeve 510 and extending from the first stop 514 to a distal end 520 of the outer sleeve 510. The distal end 520 also includes a distal end stop 521. The support 506 includes a first detent engaging element 522 extending inwardly from an inner surface 524 of the support 506 designed to engage the first plurality of spaced apart radial detents 518. The outer sleeve 510 also includes a detent engaging ring 526 extending inwardly from an inner surface 528 of the outer sleeve 510 and radially confined within a ring groove 527.

The assembly 508 also includes an inner sleeve 530 mounted within the outer sleeve 510, where the inner sleeve 530 includes a second stop 532 disposed on an outer surface 534 of the inner sleeve 530 near a proximal end 536 of the inner sleeve 530 and a second plurality of spaced apart radial detents 538 disposed on the outer surface 534 of the inner sleeve 530 extending from at or near a distal end 540 to the second stop 532 of the inner sleeve 530. The distal end 540 also includes a distal end stop 541. The inner sleeve 530 is designed to stepwise extend out from the outer sleeve 510 as sufficient force is applied to the proximal end 536 of the inner sleeve 530 to push the second engaging element 526 past one or more of the spaced apart detents 538. The inner sleeve 530 can be retracted by applying a sufficient force to the distal end 540 to push the second engaging member 526 back past one or more of the spaced apart detents 538. The outer sleeve 510 is designed to stepwise extent out from the support 506 as sufficient force is applied to the proximal end 514 of the outer sleeve 510 to push the first engaging element 522 past one or more of the first spaced apart detents 518, while the process can be retracted by pushing against the distal end of the outer sleeve 510. The apparatus 500 can also includes o-rings 542 situated within an o-ring groove 544.

Figure 6A:
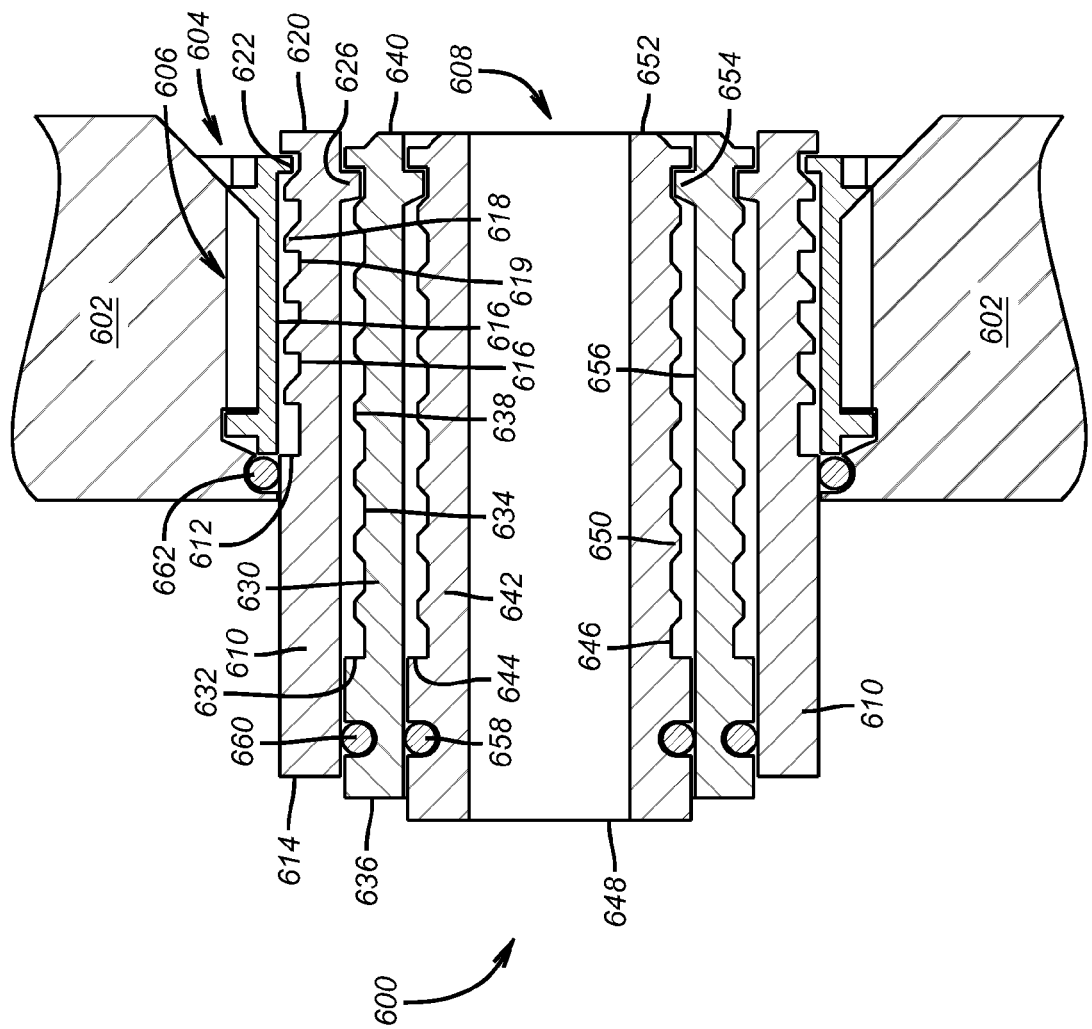
FIGS. 6A & B depict another preferred embodiment of a extension/retraction assembly of this invention having three extendable sleeves.
Figure 6B:
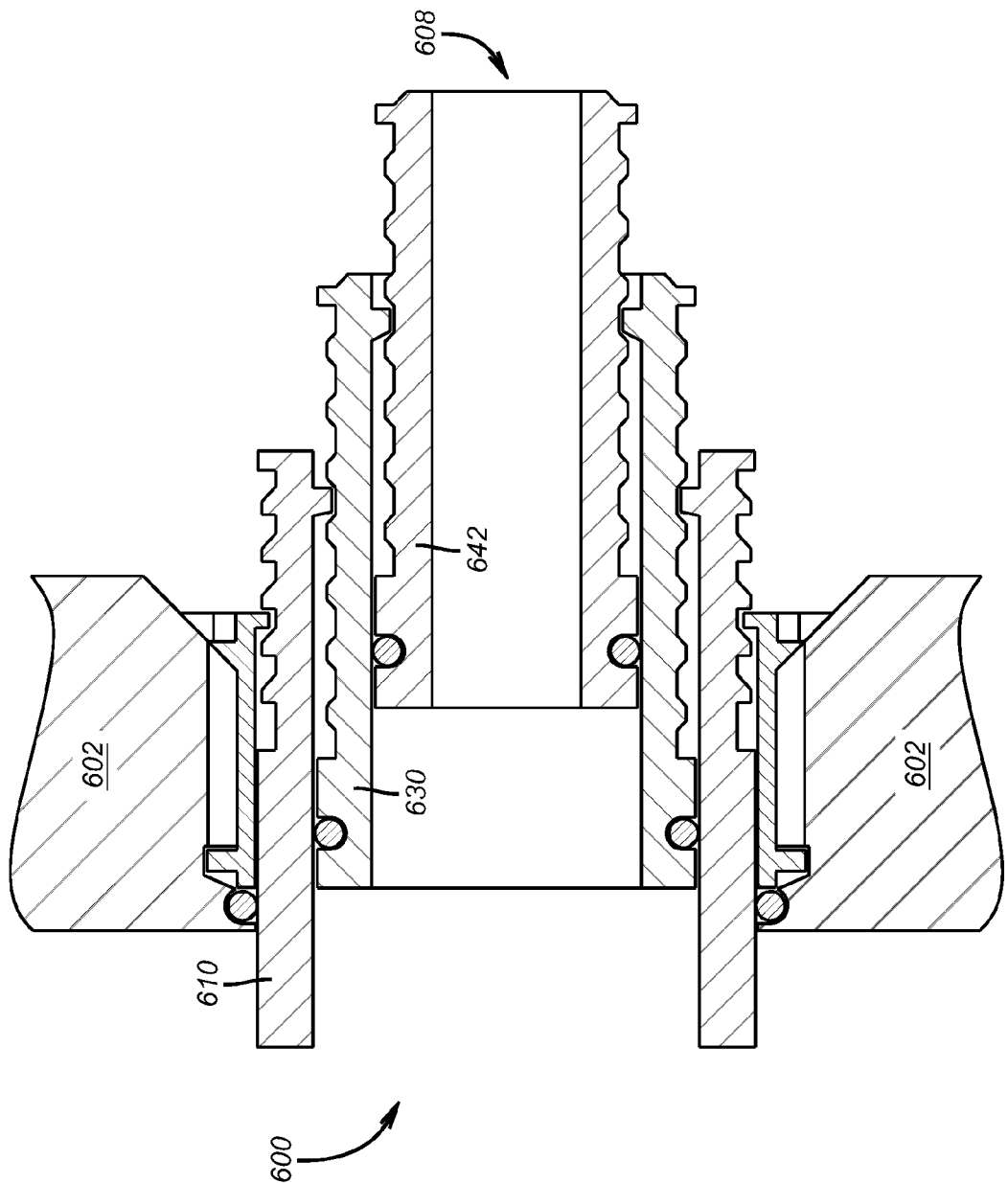

Referring now to FIGS. 6A-B, another preferred embodiment of an extension/retraction apparatus of this invention, generally 600, is shown in its contracted state and in a partially extended state. The apparatus 600 includes a housing 602 including an aperture 604 having mounted therein an outer sleeve support 606 supporting an extension/retraction spring locking assembly 608.

The assembly 608 includes a first sleeve 610 mounted on the support 606. The first sleeve 610 includes a first stop 612 and a proximal end 614, where the stop 612 is disposed of an outer surface 616 of the first sleeve 612 and a first plurality of spaced apart radial detents 618 are also disposed on the outer surface 616 of the first sleeve 610 and extend from the first stop 612 to a distal end 620 of the first sleeve 610. The distal end 620 includes a distal end stop 621.

The support 606 includes a first detent engaging element 622 extending downwardly from an inner surface 624 of the support 606 designed to engage the first plurality of spaced apart detents 618 disposed on the outer surface 616 of the first sleeve 610. The first sleeve 610 also includes a second detent engaging member 626 extending downwardly from an inner surface 628 of the first sleeve 610.

The assembly 608 also includes a second sleeve 630 mounted within the first sleeve 610, where the second sleeve 630 includes a second stop 632 and an outer surface 634 and a proximal end 636 and a second plurality of spaced apart radial detents 638 disposed on the outer surface 634 of the second sleeve 630 extending from at or near a distal end 640 to the second stop 632 of the second sleeve 630. The distal end 640 includes a distal end stop 641.

The assembly 608 also includes a third sleeve 642 mounted within the second sleeve 630, where the third sleeve 642 includes a third stop 644 and an outer surface 646 and a proximal end 648 and a third plurality of spaced apart detents 650 disposed on the outer surface 646 of the third sleeve 642 extending from at or near a distal end 652 to the third stop 644 of the third sleeve 642. The second sleeve 642 also includes a third detent engaging member 654 extending downwardly from an inner surface 656 of the second sleeve 642. The distal end 652 includes a distal end stop 653.

The assembly 608 is capable of extending in a three step process. First, the third sleeve 642 is designed to stepwise extend out from the second sleeve 630 as sufficient force is applied to the proximal end 648 of the third sleeve 642 to push the third engaging member 654 past one or more of the spaced apart third detents 650. The third sleeve 642 can be retracted by applying a sufficient force to the distal end 652 to push the third engaging member 654 back past one or more of the spaced apart third detents 650.

Second, the second sleeve 630 is designed to stepwise extend out from the first sleeve 610 as sufficient force is applied to the proximal end 636 of the second sleeve 630 to push the second engaging member 626 past one or more of the spaced apart second detents 638. The second sleeve 630 can be retracted by applying a sufficient force to the distal end 640 to push the second engaging member 626 back past one or more of the spaced apart detents 638.

Third, the first sleeve 610 is designed to stepwise extent out from the support 606 as sufficient force is applied to the proximal end 614 of the first sleeve 610 to push the first engaging member 622 past one or more of the first spaced apart detents 618, while the process can be retracted by pushing against the distal end of the first sleeve 610. The apparatus also includes three O-rings 658, 660 and 662.

Figure 8:
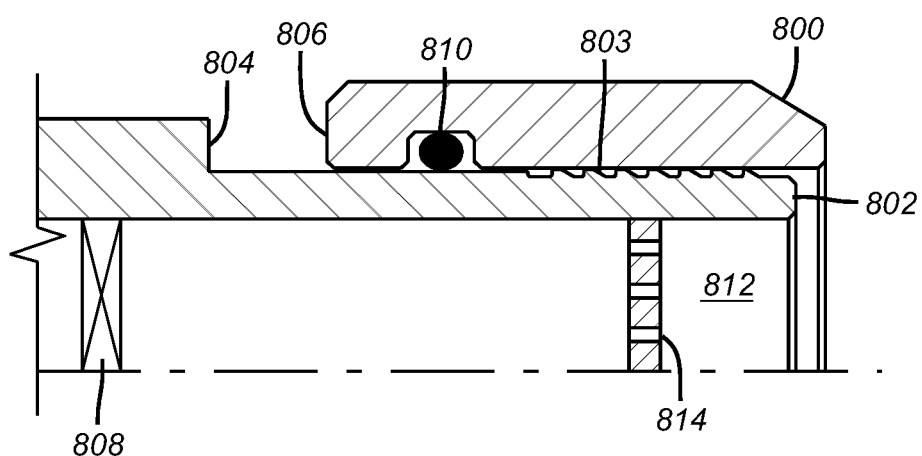
FIG. 8 is an alternative embodiment showing the use of an interference fit to provide resistance to extension when the telescoping assembly is exposed to a force.

Referring now to FIGS. 7A-F, other variation of the form of the sleeves used in the extension/retraction apparatuses of this invention, generally 700, are shown. Looking at FIG. 7A, a sleeve 702 having a reduced inner diameter section 704 is shown. Looking at FIG. 7B, a sleeve 702 having a tapered inner diameter section 706 is shown. Looking at FIG. 7C, a sleeve 702 having a stepped reduced inner diameter section 708 is shown. Looking at FIG. 7D, a sleeve assembly 710 including a cushion 712 is shown. Annular space 720 can retain grease or some other viscous fluid as sleeve 722 gets pushed with respect to sleeve 724. Such relative movement decreases the volume of space 720 and tends to eject the grease, viscous fluid or simply some sort of hydraulic fluid through an opening 726 that can be a drilled hole or holes or an opening with a removable orifice installed in it. The size of the opening and the properties of the fluid being pushed through the opening 726 acts as a regulator of the rate of movement of sleeve 722 and cushions the impact of cushion 712 against the stop 728 on full extension. Looking at FIG. 7E, a sleeve 702 having detents 714 of varying height are shown. Looking at FIG. 7F, a sleeve 702 is shown having tapered detents 716. FIG. 8 shows a stationary sleeve 800 surrounding a movable sleeve 802. In between is a surface roughness 803 that can be on either sleeve 800 or 802 or, alternatively, both. Sleeve 802 has a shoulder 804 that eventually contacts stop surface 806 after enough pressure is developed on breakable barrier 808, which can be a rupture disc or equivalent. Preferably the fit between sleeves 800 and 802 is an interference fit which when coupled with the roughness 803, which can be random or an ordered pattern, regulates the extension rate of the sleeve 802. Seal 810 seals between the relatively moving sleeves 800 and 802 such that when barrier 808 breaks a fluid path without leaks is provided. In one application sleeve 800 can be attached to casing and sleeve 802 can extend into a surrounding formation to allow the formation to be produced through passage 812, which can also contain a screen 814. In this manner the formation can be produced without perforation through the casing and without having a need to gravel pack. Additionally, the sealing between the sleeves 800 and 802 further keeps out any cementing in the surrounding annulus outside a casing that goes on after extension of sleeve 802 from sleeve 800 that is attached to the casing.

It should be recognized that the force needed to extend or retract each of the sleeves in a multi-sleeve telescoping assembly can be adjusted so that each sleeve extends upon the application of a different force. Thus, the first or outer most sleeve can extend first, followed by each of the inner sleeves, or conversely, the inner most sleeve can extend first, followed by each of the outer sleeves. The load required to move one sleeve relative to the other and the outer most sleeve relative to the support can be varied by changing the design characteristics and material properties of the stops and the detents.

The multi-moveable sleeve extension/retraction apparatuses of this invention include sleeves having detents or bumps that require radial expansion or contraction to activate. The load required to expand or contract the rings depends on a hoop spring rate of the tubular rings as well as the geometry of the detents and the stops such as their amount of radial deflection, their ramp angle, and their axial lengths, and on the detents and stops surface properties, e.g., finish, hardness, etc., and the detents and stops material properties, e.g., modulus of elasticity, deformability, flowability, etc. The figures show apparatuses of this invention having two or three shifting sleeves, but any number of sleeves may be used to achieve greater telescopic reach, if so desired. Also, the number of detents that set the position is shown as singular to optimize stroke, but any multiple could be used for improved position retention. Finally, the number of detents and their positions and the stop configuration operate to define strength, stroke, and load requirements for a given apparatus and these characteristics can be varied to the application at hand.

In the case that the housing is a casing segment, as internal pressure is applied against the proximal ends of the sleeves of the extension/retraction assembly, i.e., pressure directed to extend the sleeve, is applied, the moveable sleeves ratchet outward. Again, the sleeve extension pressures can be varied so that the inner most sleeve move first or the outer most sleeve moves first. Alternatively, the sleeve may have the same extension force requirements, which means that the extension will be distributed randomly across all moveable sleeves until the distal end of the entire assembly contacts a hard surface such as the borehole surface.

The alternative approach of FIG. 6, which also uses the same basic principals of extension and retraction, utilized a ring instead of a stop as shown in FIGS. 4 and 5. This preferred design can provide greater flexibility for varying and setting a desired load to activate the mechanism and provides another means for final assembly. This approach uses a split-ring fitted into a mating groove, which radially constrains the ring. The cross-section of the ring shown in the FIG. 6 is a hollow cylinder, but any hollow or solid ring or any desired geometrical configuration may be used as well. The material properties and the geometrical configuration of the ring determine the desired latching properties. Additionally, the rings and detents can be constructed out of different materials to control locking properties. Any metal, high performance plastic, or hard rubber compound may be employed and this provides yet another means to change the loading characteristics.

While we have attempted to describe the invention as it relates to the telescoping sleeves assemblies and the connectors described above, it should be understood that there are many types of devices used in oilfield operations that could benefit from these types of devices. The present connectors or telescoping assemblies can be used in almost any tool or device that currently uses shear screws, shear wires and the like. Some examples include packer setting tools, circulation sleeves, ball seats, and shear-out subs. Other examples of equipment that use spring collets include latching seal assemblies, indicating subs, and tool retrieving heads. Another method of the invention is to design the detents such that they ensure mechanical failure of the two latched tool segments. This would be of particular use to replace a shear-out safety joint commonly used on gravel pack screens. Because these types of applications require two segments to be joined together and parted once, the detents are only required for a one time use.

Those skilled in the art will appreciate that the applications for the invention are broad, as stated above. A particular advantage is the ability to have relative movement between nested sleeves while controlling its rate and limiting maximum travel while also being able to provide a dynamic seal between the members as they move relatively. The rate regulation can be done in a variety of ways that include a row of protrusions running over a detent with such motion being made possible by radial flexing of one of the members. The rate of travel can be regulated by displacing substances from a variable volume cavity as relative movement occurs. These substances can be grease or viscous fluids that are displaced through an orifice during the relative movement. Alternatively, surface roughness between relatively moving surfaces can regulate the rate of extension. Bumpers or cushions can be used to reduce shock at the extremes of the relative movement range either in extension or contraction. Locking mechanisms are contemplated so that, for example, upon reaching any level of extension or full extension, movement in the opposed direction is prevented. Alternatively, extension and retraction can be accomplished with the series of protrusions riding over a detent. One application of the invention is for telescoping assemblies that can be mounted on a tubular and that define a passage that is temporarily closed such as with a rupture disc or an equivalent temporary barrier that is sensitive to well conditions to allow access to the passage after the needed extension. The tubular is positioned downhole and pressure is exerted to create the telescoping motion and at the same time open the passage through the telescoping members. The extension of the telescoping members to the borehole wall takes away the need to perforate or gravel pack before the formation can be produced through the extended telescoping members. Different telescoping assemblies can extend different amounts to contact an irregular open hole shape so that the extension continues until the borehole wall is reached or the limit of extension is reached, whichever comes first. A production string and packer allows the formation to be produced to the surface. The telescoping assemblies can be locked at whatever extension they wind up accomplishing as determined by the shape of the open hole.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

The invention claimed is:

1. A method for downhole operation comprising the steps of: connecting a tool or drill bit assembly to a distal end of a string from an initial position where the tool or drill bit are not connected to the string, where the distal end of the string includes a male or female connector and a proximal end of the tool or the drill bit assembly includes a mating connector, where the male connector includes a rigidly mounted cantilevered detent engaging member disposed on an outer surface of the male connector and the female connector includes a plurality of detents disposed on an inner surface of the female connector extending from the proximal end of the female connector toward a distal end of the tool or the drill bit assembly, where the male connector is designed to be inserted into initial contact into the female connector with sufficient axial force to push the engaging member over each of the plurality of detents without rotation.

2. The method of claim 1, comprising: running the tool or drill assembly bit to a subterranean location; and operating the tool or drill bit assembly at the subterranean location.

3. The method of claim 1, comprising: performing said connecting at the subterranean location.

4. The method of claim 3, comprising: removing the tool or drill assembly bit from the subterranean location after said connecting.

5. The method of claim 1, comprising: providing a rigidly mounted cantilevered detent engaging element disposed radially on an outer surface of said male connector; and providing a plurality of detents disposed on an inner surface of said female connector, relatively moving said connectors in response to internal force or pressure provided through said string; moving said element of said male connector to engage the plurality of detents of the said female connector in a step-wise fashion with application of pressure or force from said string applied to at least one of said connectors.

6. The method of claim 5, comprising: making the detents identical or substantially similar so that the actuating force associated with each detent is the same or substantially similar.

7. The method of claim 5, comprising: making a line along the peaks of said plurality of detents tapered with respect to a centerline of said female connector.

8. The method of claim 1, comprising: providing at least one wall opening in said string; providing a telescoping assembly supported in said opening comprising a stationary member and at least one relatively movable member, said members defining a passage therethrough and said movable member defining a distal end of said passage; providing a series of differing projections mounted to one of the stationary member and said movable member that ride over a rigidly mounted cantilevered detent on the other of said stationary member and said movable member as relative movement between said members occurs in response to a varied applied force; providing a seal between said members so that said passage is sealed between the tubular wall and said passage distal end by said seal during said relative movement.

9. The method of claim 8, comprising: providing a regulation device to control the rate of movement between said stationary and said relatively movable member.

10. The method of claim 9, wherein: providing said regulation device by flexing of one of said members radially toward or away from the other of said members as relative longitudinal movement between them occurs.

11. The method of claim 9, wherein: providing in said regulation device a variable volume cavity between said members that contains a material that is displaced as the volume of said cavity decreases during said relative movement.

12. The method of claim 11, wherein: displacing said material though an orifice.

13. The method of claim 9, wherein: providing as said regulation device a surface roughness between said members.

14. The method of claim 9, wherein: providing as said regulation device an interference fit between said members.

15. The method of claim 10, further comprising: providing a ratchet mechanism that allows longitudinal movement in only one direction.

16. The method of claim 10, further comprising: providing a travel stop to limit longitudinal movement in at least one direction.

17. The method of claim 16, further comprising: providing a cushion mounted to one of said members to cushion impact against said travel stop.

18. The method of claim 10, further comprising: providing a removable barrier in said passage to aid in creating said longitudinal movement responsive to an applied pressure; removing said barrier upon occurrence of said longitudinal movement.

19. The method of claim 18, further comprising: progressively sizing of said projections that engage said detent larger to change the force required for longitudinal movement throughout the available range of movement.

20. The method of claim 16, further comprising: providing tapers that engage each other between said members to act as said travel stop.

* * * * *